(12) United States Patent
Ho

(10) Patent No.: US 7,530,807 B2
(45) Date of Patent: May 12, 2009

(54) MOLD STRUCTURE WITH AN EJECTING TUBE FOR EJECTING A MOLDED PRODUCT AND PERMITTING AIRFLOW

(76) Inventor: Yu-Pei Ho, No. 71, Lane 272, Kuang-fu Rd., Hsi-Tun Dist., Taichung City (TW)

( * ) Notice: Subject to any disclaimer, the term of this patent is extended or adjusted under 35 U.S.C. 154(b) by 172 days.

(21) Appl. No.: 11/700,524

(22) Filed: Jan. 30, 2007

(65) Prior Publication Data

US 2008/0181978 A1    Jul. 31, 2008

(51) Int. Cl.
*B29C 45/40* (2006.01)
*B29C 45/43* (2006.01)

(52) U.S. Cl. .................. 425/437; 425/556; 425/441

(58) Field of Classification Search .......... 425/139, 425/437, 556, 577, 812, 441, 443; 264/334, 264/335
See application file for complete search history.

(56) References Cited

U.S. PATENT DOCUMENTS

| | | | | |
|---|---|---|---|---|
| 4,412,806 A | * | 11/1983 | Gaiser et al. | 425/554 |
| 4,502,659 A | * | 3/1985 | Stephenson et al. | 249/66.1 |
| 4,990,077 A | * | 2/1991 | Morita | 425/130 |
| 5,090,888 A | * | 2/1992 | Pfannkuchen | 425/438 |
| 5,368,468 A | * | 11/1994 | Boskovic | 425/556 |
| 5,511,967 A | * | 4/1996 | Berdan | 425/533 |
| 5,630,977 A | * | 5/1997 | Catalanotti et al. | 264/318 |
| 5,693,282 A | * | 12/1997 | Sorensen et al. | 264/297.2 |
| 6,042,361 A | * | 3/2000 | Murphy | 425/546 |
| 6,457,968 B1 | * | 10/2002 | Navarra Pruna | 425/556 |
| 6,827,569 B2 | * | 12/2004 | Wieder | 425/130 |
| 6,877,974 B2 | * | 4/2005 | Puniello et al. | 425/116 |
| 6,923,629 B2 | * | 8/2005 | Ahn et al. | 425/28.1 |
| 2005/0156349 A1 | * | 7/2005 | Wolfe et al. | 264/154 |

* cited by examiner

*Primary Examiner*—Yogendra Gupta
*Assistant Examiner*—Emmanuel S Luk
(74) *Attorney, Agent, or Firm*—Merchant & Gould P.C.

(57) ABSTRACT

A mold structure includes an ejecting tube disposed movably within a guide hole in a lower mold unit and having an ejecting end. The ejecting tube is communicated with an air chamber in the lower mold unit and a mold cavity. A pneumatic device is operable to draw air from the mold cavity into the ejecting tube. The ejecting tube is operable to move within the guide hole between a retracted position whereat the ejecting end is disposed outwardly of the mold cavity, and an ejecting position whereat the ejecting end is moved into the mold cavity so as to allow a molded product to be removed from the lower mold unit. The pneumatic device is also operable to introduce compressed air therefrom into the mold cavity via the air chamber and the ejecting tube.

7 Claims, 18 Drawing Sheets

MOLD STRUCTURE WITH AN EJECTING TUBE FOR EJECTING A MOLDED PRODUCT AND PERMITTING AIRFLOW

BACKGROUND OF THE INVENTION

1. Field of the Invention

This invention relates to a mold, and more particularly to a mold structure that includes an ejecting tube for ejecting a molded product and permitting airflow.

2. Description of the Related Art

Referring to FIG. 1, a conventional mold structure 10 includes an upper mold unit 11, a lower mold unit 12, an air passage unit 13, and an ejecting unit 14. The upper and lower mold units 11, 12 are interconnected so as to define a mold cavity 101 therebetween. The uppermold unit 11 is formed with a feeding port 111 communicated with the mold cavity 101. The air passage unit 13 includes an air passage 131 communicated with the mold cavity 101, and a plurality of venting tubes 132 communicated with the air passage 131 and a pneumatic device (not shown). The pneumatic device is operable to draw air from the mold cavity 101 thereinto via the air passage unit 13. As such, a molding material 1 fed through the feeding port 111 can be drawn to fill within the mold cavity 101. The ejecting unit 14 includes a movable seat 141 disposed movably within the lower mold unit 12, and a plurality of ejecting rods 142 having lower ends connected fixedly to the movable seat 141. Upper ends of the ejecting rods 142 are disposed outwardly of the mold cavity 101. After a molded product is formed within the mold cavity 101, the upper mold unit 11 is removed from the lower mold unit 12. Subsequently, a driving device (such as a hydraulic device) is operated so as to move the movable seat 141 and the ejecting rods 142 upwardly in the lower mold unit 12. Hence, the upper ends of the ejecting rods 142 move into the mold cavity 101 to thereby remove the molded product from the lower mold unit 12.

The aforesaid conventional mold structure 10 suffers from the following disadvantages:

(1) Since the air passage unit 13 is disposed in proximity to a left end of the mold cavity 101, when a portion of the mold cavity 101 has a complicated shape, it is difficult for the molding material to reach a molding surface defining this portion of the mold cavity 101. To enable the molding material to reach the molding surface, it is necessary to increase a pressure for pouring the molding material into the mold cavity 101. When an increasing pressure is applied between the upper and lower mold units 11, 12, veins may be formed in the mold structure 10 where the upper and lower mold units 11, 12 are interconnected. Due to the presence of the veins, when molding, burr edges are formed on the molded product. Furthermore, when the pressure applied is excessive, the upper and lower mold units 11, 12 easily deform, thereby resulting in difficulties in removing the upper and lower mold units 11, 12 from each other and reducing the service life of the upper and lower mold units 11, 12. To solve this problem, the upper and lower mold units 11, 12 can be made of a high-strength metal. However, this increases the manufacturing costs of the upper and lower mold units 11, 12.

(2) If the mold structure 10 has a plurality of mold cavities 101, the number of the mold cavities 101 can be reduced so as to allow the molding material 1 to fill completely the mold cavities 101. However, this reduces significantly the production capacity of the mold structure 10.

SUMMARY OF THE INVENTION

The object of this invention is to provide a mold structure that can overcome the above-mentioned disadvantages associated with the prior art.

According to this invention, a mold structure includes an ejecting tube disposed movably within a venting hole in a lower mold unit and having an ejecting end. The ejecting tube is communicated with an air chamber in the lower mold unit and a mold cavity. A pneumatic device is operable to draw air from the mold cavity into the ejecting tube. The ejecting tube is operable to move within the venting hole between a retracted position whereat the ejecting end is disposed outwardly of the mold cavity, and an ejecting position whereat the ejecting end is moved into the mold cavity so as to allow a molded product to be removed from the lower mold unit. The pneumatic device is also operable to introduce compressed air therefrom into the mold cavity via the air chamber and the ejecting tube.

BRIEF DESCRIPTION OF THE DRAWINGS

These and other features and advantages of this invention will become apparent in the following detailed description of a preferred embodiment of this invention, with reference to the accompanying drawings, in which.

DETAILED DESCRIPTION OF THE PREFERRED EMBODIMENT

Figure 1:
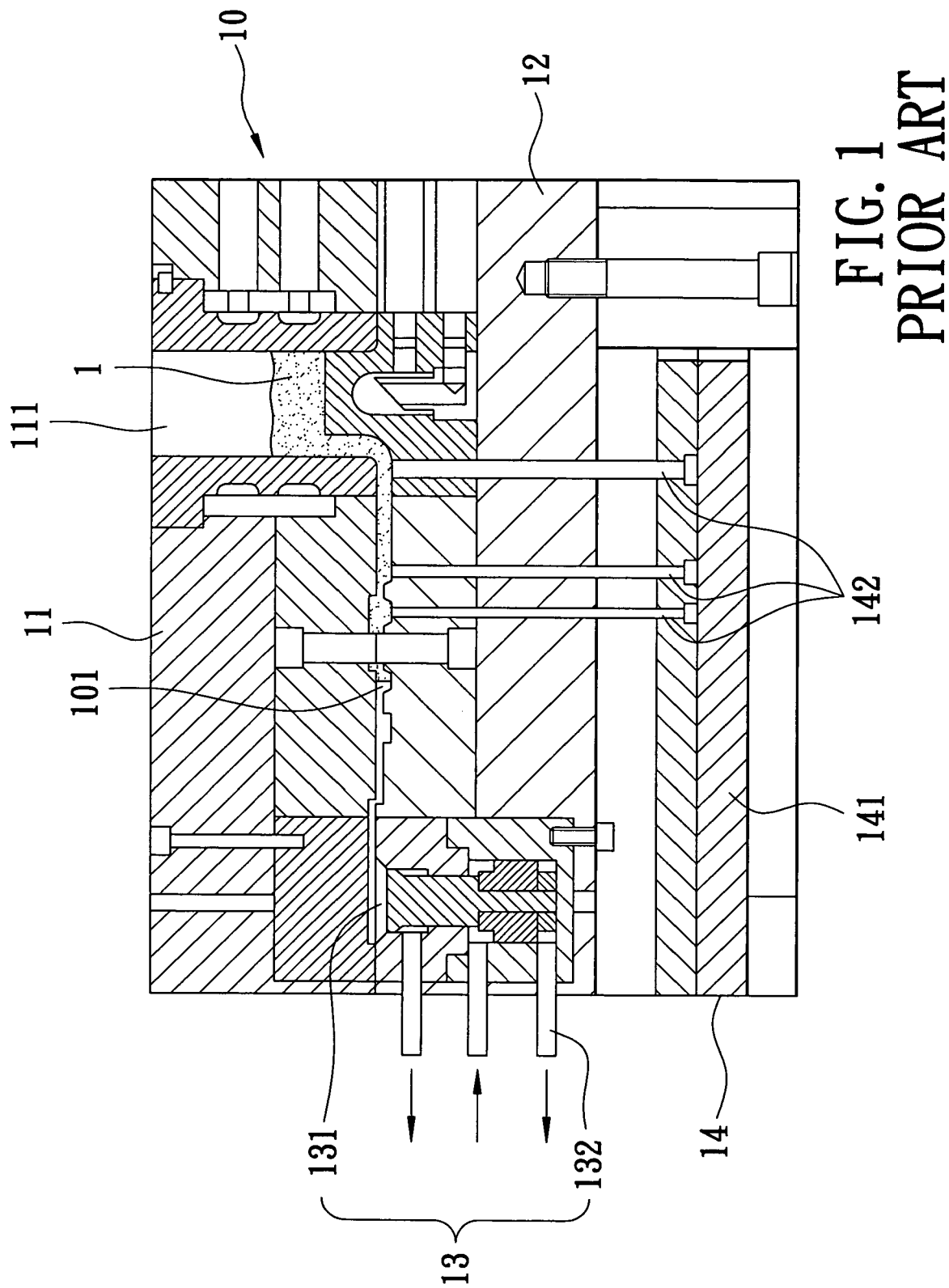
FIG. 1 is a sectional view of a conventional mold structure.
Figure 1A:
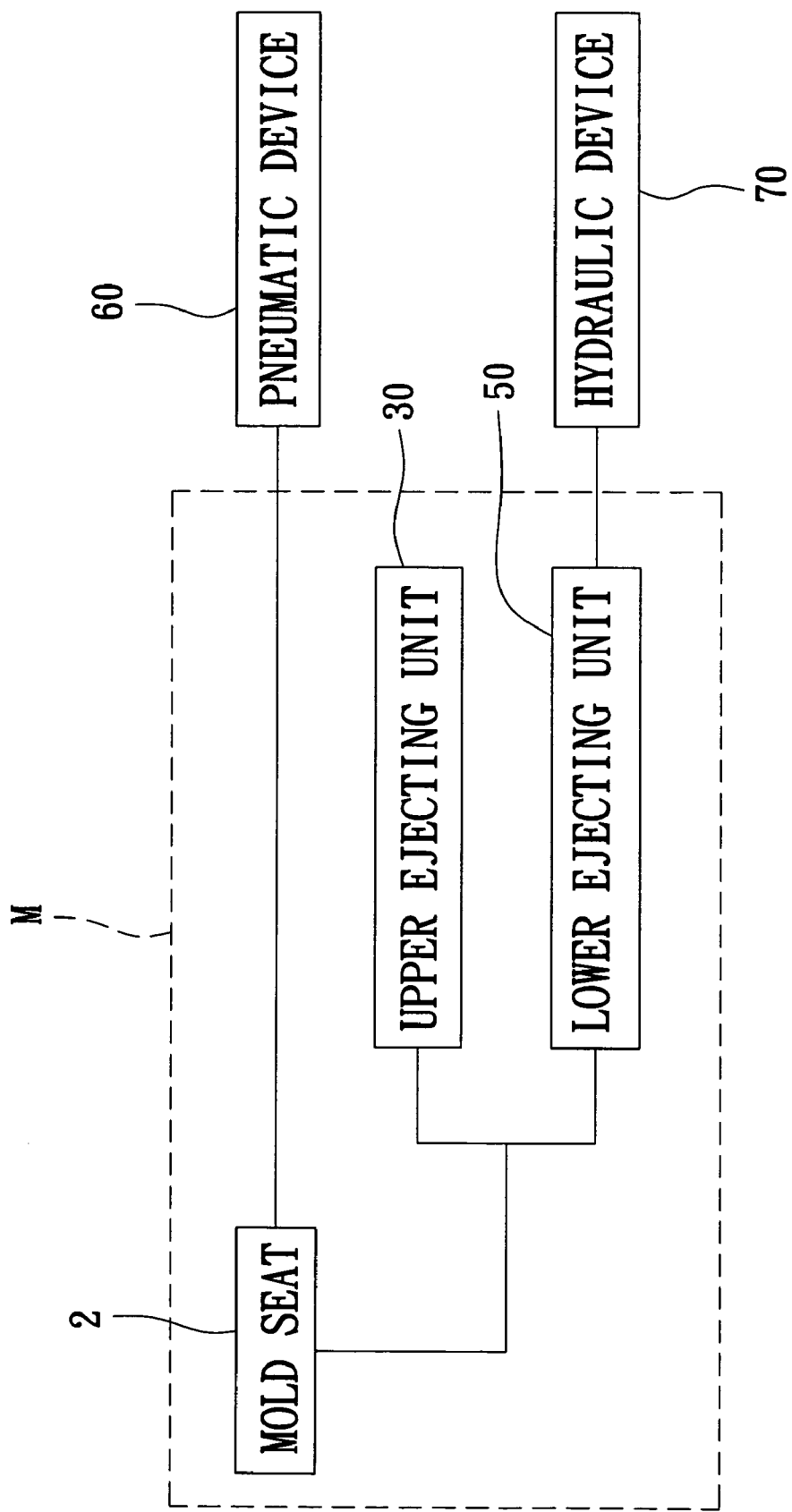
FIG. 1A is a schematic block diagram of the preferred embodiment of a mold structure according to this invention, illustrating how the preferred embodiment is connected to a pneumatic device and a hydraulic device.
Figure 2:
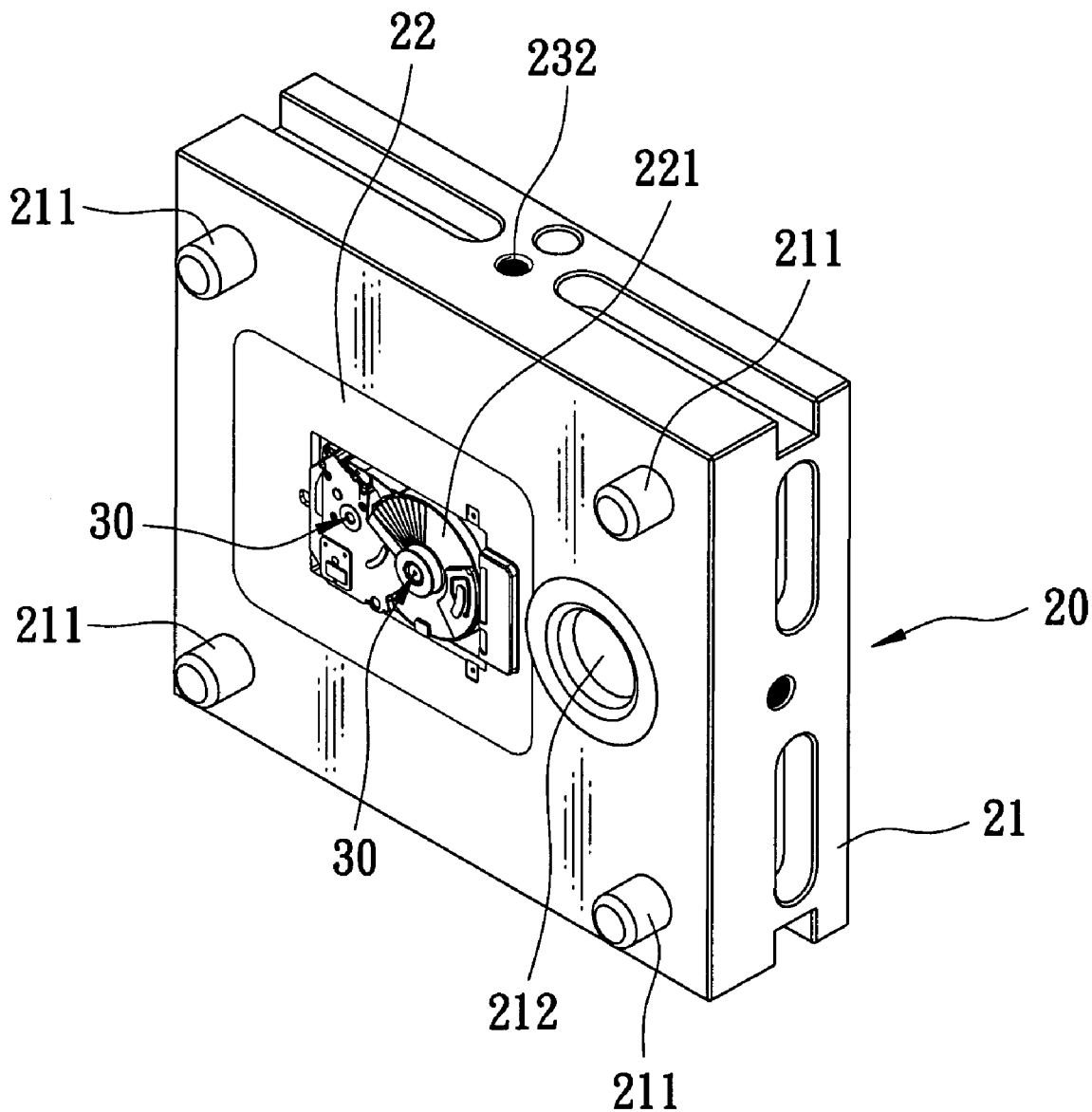
FIG. 2 is a perspective view of an upper mold unit of the preferred embodiment.
Figure 3:
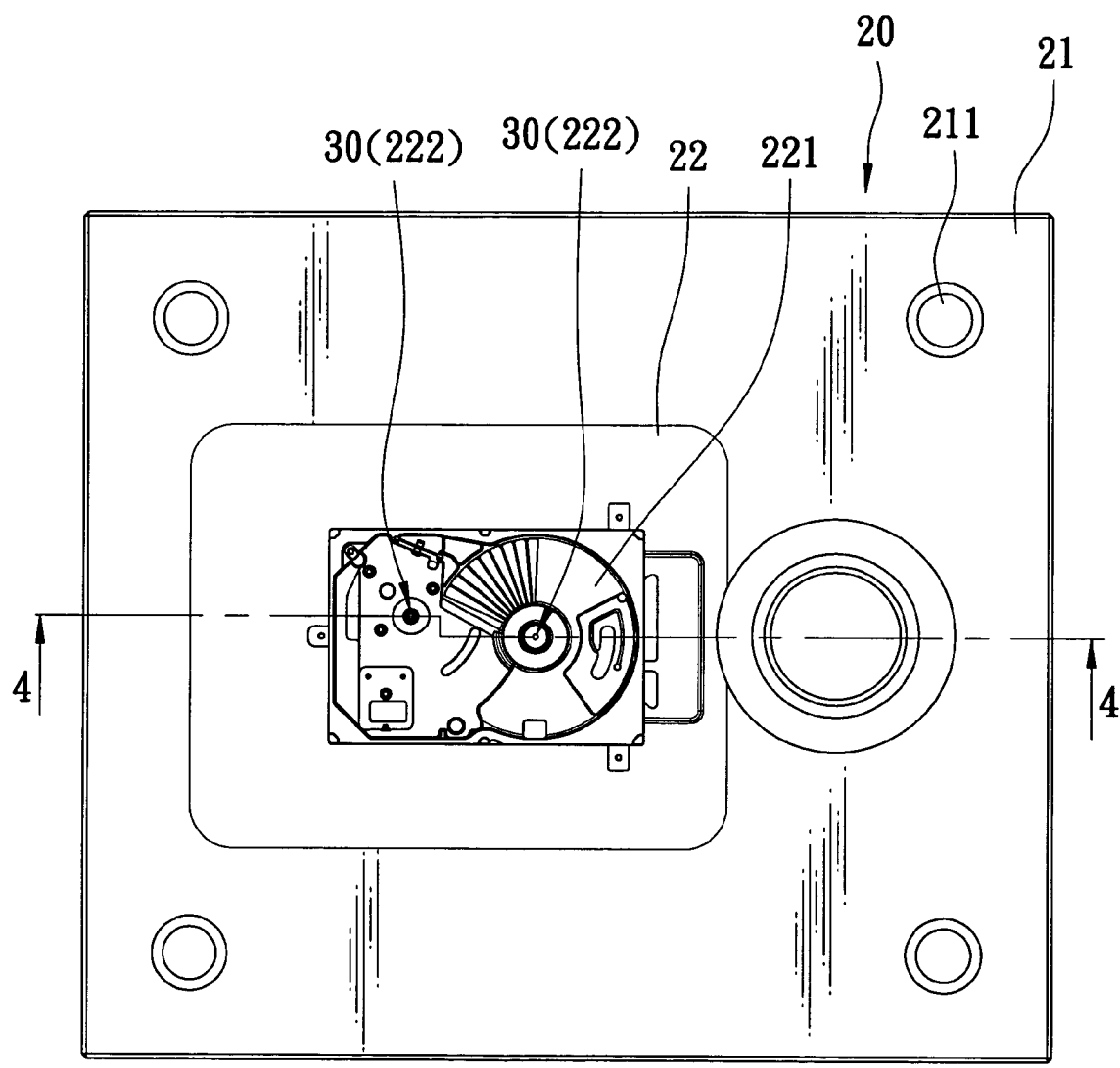
FIG. 3 is a bottom view of the upper mold unit of the preferred embodiment.
Figure 4:
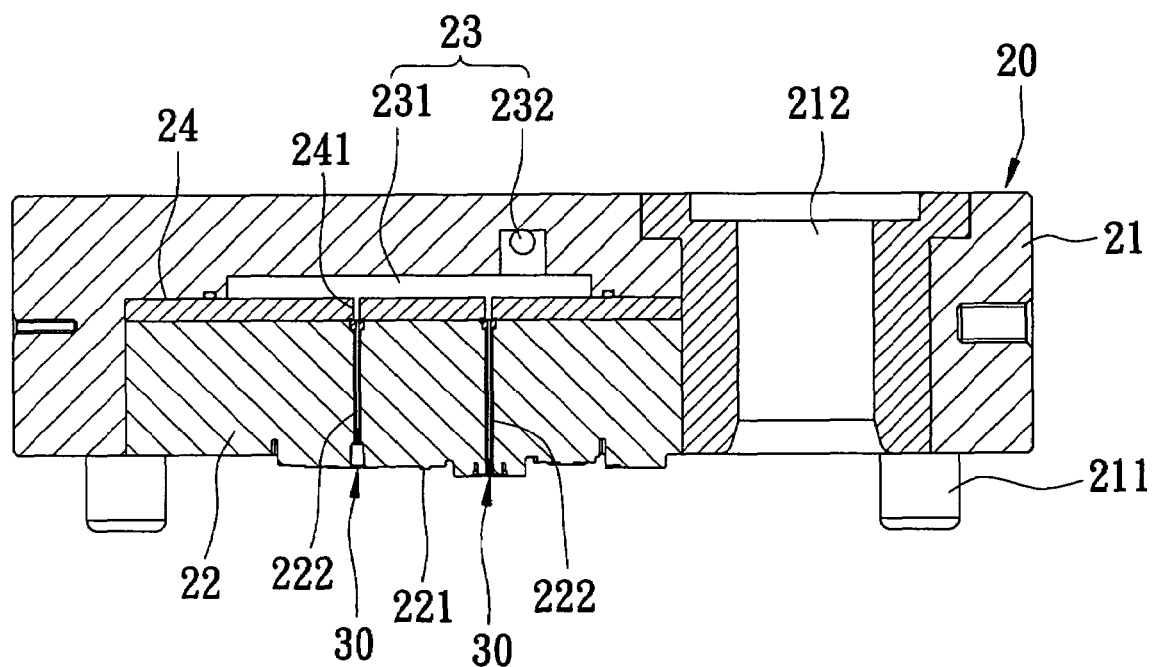
FIG. 4 is a sectional view taken along Line 4-4 in FIG. 3.
Figure 5:
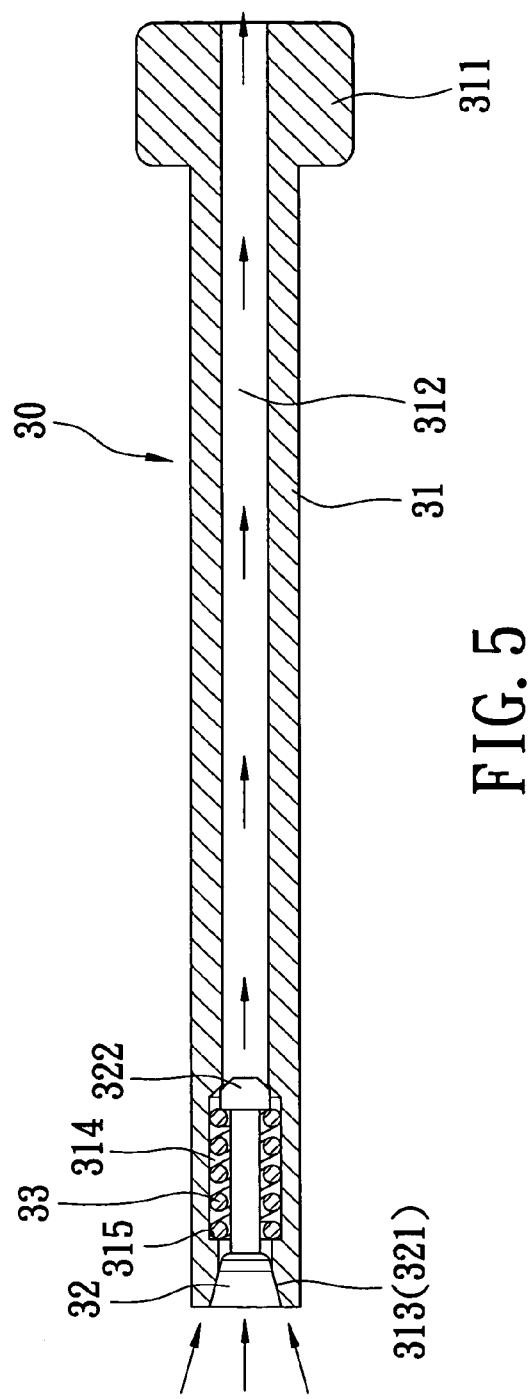
FIG. 5 is a sectional view of an upper ejecting unit of the preferred embodiment when an ejecting rod of the upper ejecting unit is disposed in a retracted position.
Figure 5A:
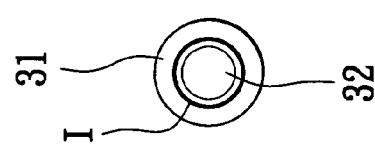
FIG. 5A is a schematic view illustrating an annular gap formed between a venting tube and an ejecting block of the upper ejecting unit of the preferred embodiment.
Figure 6:
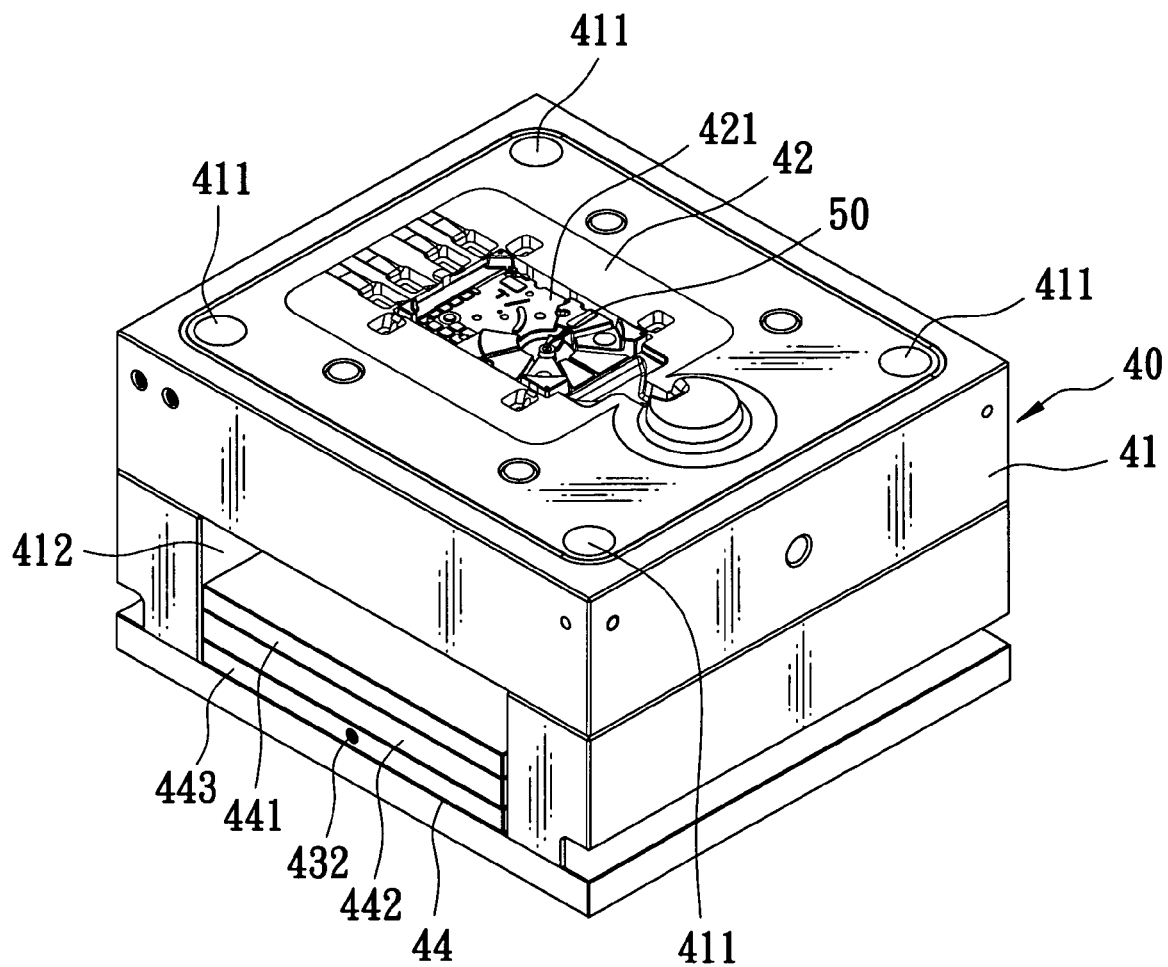
FIG. 6 is a perspective view of a lower mold unit of the preferred embodiment.
Figure 7:
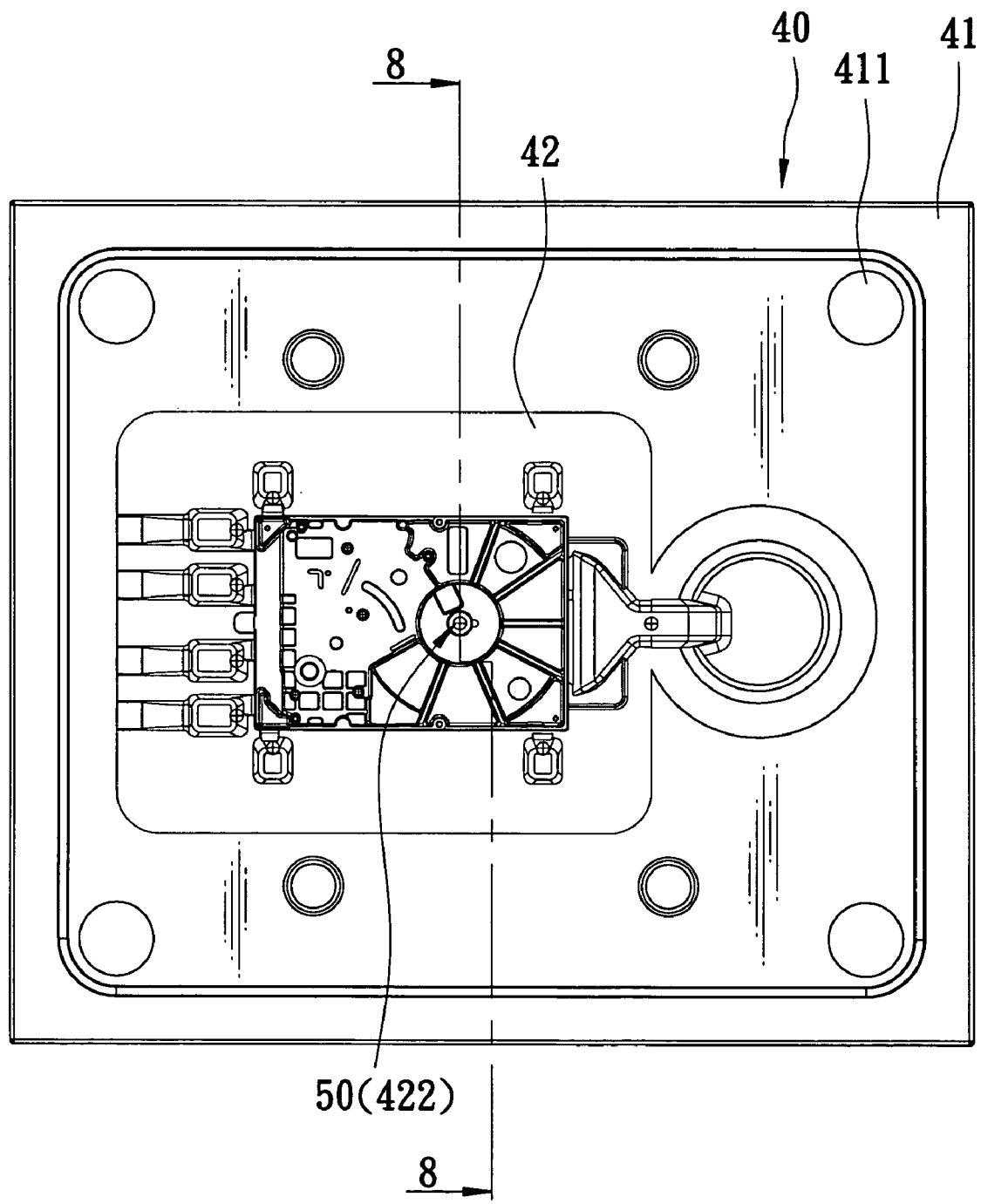
FIG. 7 is a top view of the lower mold unit of the preferred embodiment.
Figure 10:
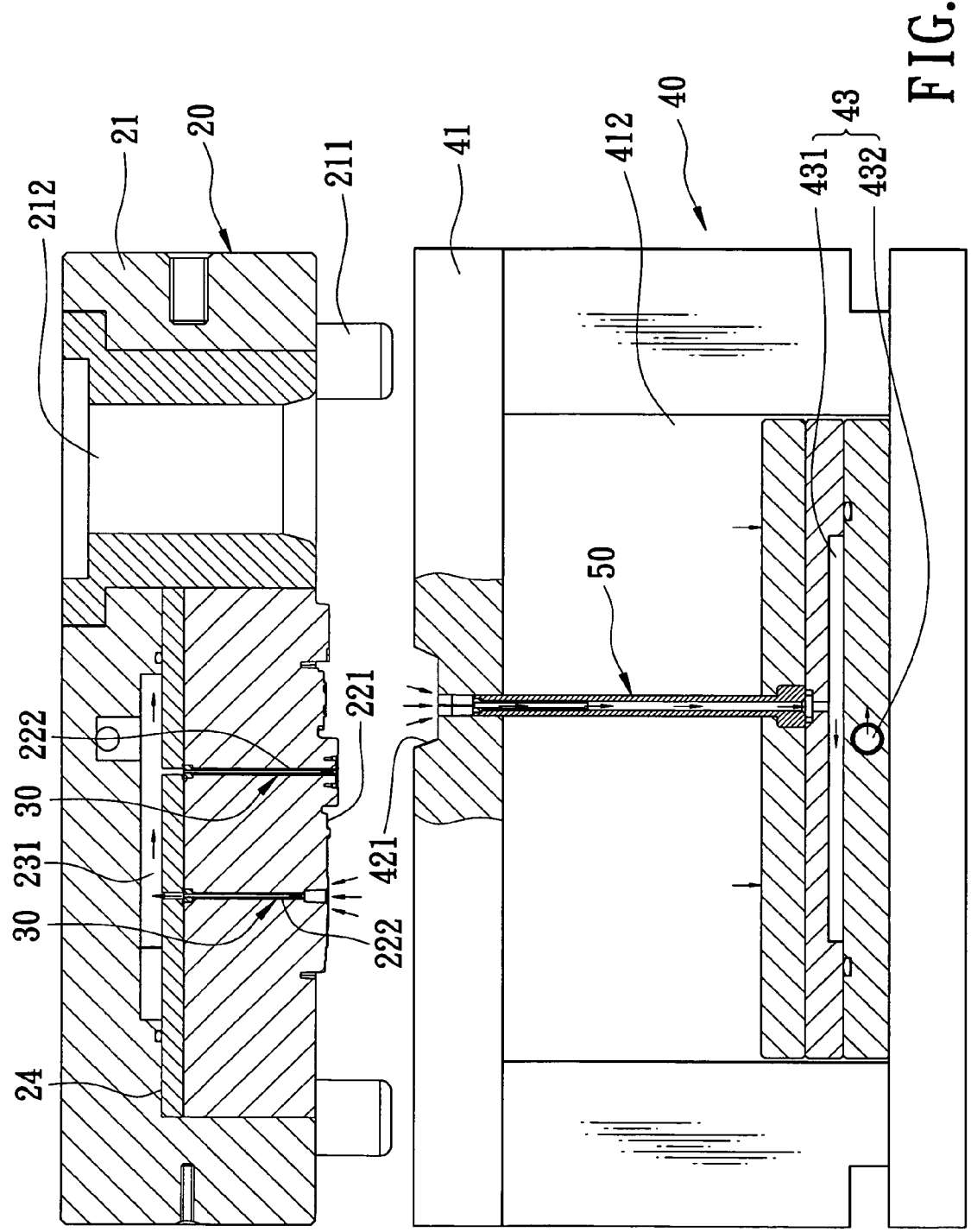
FIG. 10 is a schematic, partly exploded, partly sectional view of the preferred embodiment, illustrating how air is drawn from a mold cavity.
Figure 14:
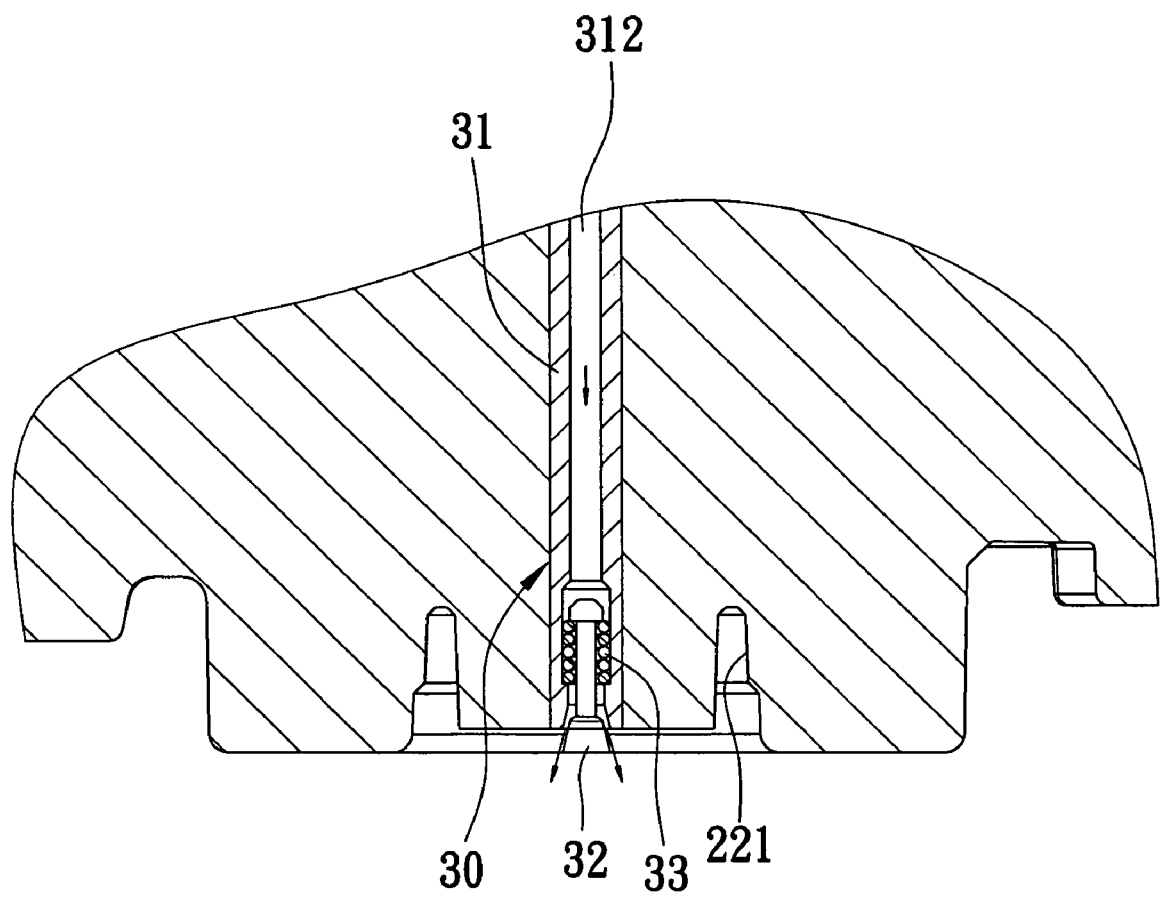
FIG. 14 is a fragmentary sectional view of the preferred embodiment, illustrating an ejecting position of the ejecting rod.

Referring to FIGS. 1A, 2, 6, and 10, the preferred embodiment of a mold structure (M) according to this invention includes a mold seat 2 and an ejecting assembly. The mold seat 2 includes a pair of upper and lower mold units 20, 40. The ejecting assembly includes a plurality of upper ejecting units 30 (only one is shown in FIGS. 1A and 10), and a plurality of lower ejecting units 50 (only one is shown in FIGS. 1A and 10). The upper mold unit 20 includes an upper mold half 21, an upper mold core 22, an upper air passage unit 23 (see FIG. 14) consisting of an upper air chamber 231 and a venting hole 232 communicated with the upper air chamber 231, and a tube-retaining member 24. The lower mold unit 40 includes a lower mold half 41, a lower mold core 42, a lower air passage unit 43 consisting of a lower air chamber 431 and a venting hole 432 communicated with the lower air chamber 431, and a movable member 44. A pneumatic device 60 can be connected to the mold seat 2 such that the upper and lower air chambers 231, 431 are communicated therewith via the venting holes 232, 432, respectively. A hydraulic device 70 can be connected to the lower ejecting units 50 for moving the same vertically.

Figure 11:
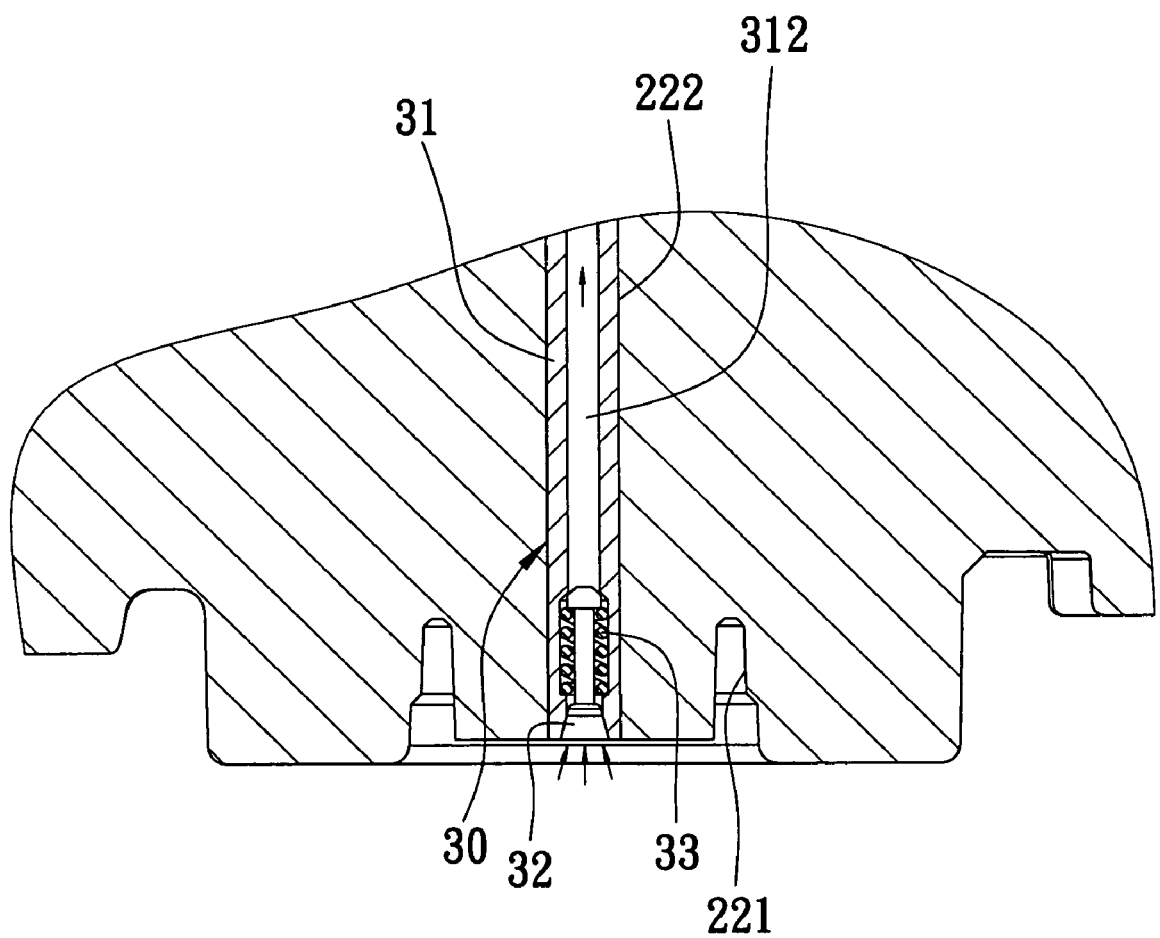
FIG. 11 is a fragmentary sectional view of the preferred embodiment, illustrating the retracted position of the ejecting rod.
Figure 15:
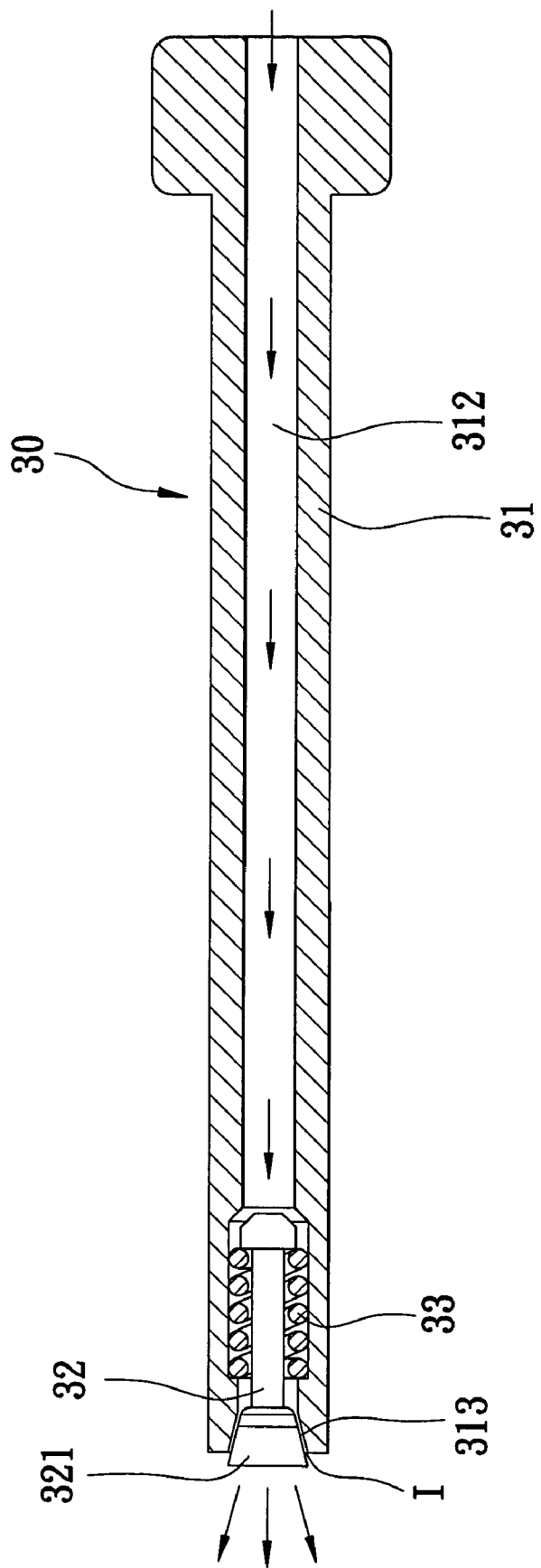
FIG. 15 is a sectional view of the upper ejecting unit of the preferred embodiment when the ejecting rod is disposed in the ejecting position.

With further reference to FIGS. 3, 4, 5, and 5A, the upper mold half 21 includes four parallel positioning pins 211 inserted respectively into four positioning holes 411 in the lower mold half 41 in a known manner, and a feeding port 212 permitting a molding material to be fed into the upper mold half 21 therethrough. The upper and lower mold cores 22, 42 are formed respectively with upper and lower molding surfaces 221, 421 defining a mold cavity therebetween. The upper mold core 22 is further formed with a plurality of vertical tube-receiving holes 222 disposed between and communicated with the mold cavity and the upper air chamber 231. The tube-receiving holes 222 are formed respectively at positions in the molding surface 221 difficult for the molding material to reach. Each of the upper ejecting units 30 includes a venting tube 31 disposed within the corresponding tube-receiving hole 222 and communicated with the mold cavity, an ejecting rod 32, and a coiled compression spring 33. The tube-retaining member 24 is attached fixedly to a top surface of the upper mold core 22 such that movement of the venting tubes 31 relative to the upper mold core 22 is prevented. The upper air chamber 231 is defined between the tube-retaining member 24 and the upper mold half 21. The tube-retaining member 24 is formed with a plurality of holes 241 having upper ends communicated with the upper air chamber 231, and lower ends communicated respectively with the venting tubes 31. Each of the venting tubes 31 has an enlarged upper end 311 fitted within an enlarged end of the corresponding tube-receiving hole 222, and an axial central hole 312 that is formed therethrough and that has an outwardly diverging frustoconical hole end 313 disposed in proximity to the mold cavity, and an enlarged hole portion 314 disposed in proximity to the frustoconical hole end 313. Each of the ejecting rods 32 is disposed movably within the frustoconical hole end 313 and the enlarged hole portion 314 of the corresponding central hole 312, and has a frustoconical ejecting block 321 disposed at an end thereof proximate to the mold cavity and within the frustoconical hole end 313 of the corresponding central hole 312, and a stop block 322 disposed at an opposite end thereof. Each of the compression springs 33 is disposed within the corresponding enlarged hole portion 314, is sleeved on the corresponding ejecting rod 32, and has two ends abutting respectively against the corresponding stop block 322 and a shoulder 315 of the corresponding venting tube 31 defining an end of the corresponding enlarged hole portion 314 so as to bias the corresponding stop block 322 away from the shoulder 315. As such, each of the ejecting rods 32 is biased by the corresponding spring 33 to a retracted position shown in FIGS. 5, 11, and 14 whereat the corresponding ejecting block 321 is disposed outwardly of the mold cavity and whereat the corresponding ejecting block 321 is received almost fittingly within the corresponding frustoconical hole end 313, that is, an annular gap (I) (see FIG. 5A) serving as an air passage is formed between the corresponding ejecting block 321 and a wall of the corresponding venting tube 31 defining the corresponding frustoconical hole end 313, and has a radial width of about 0.03 to 0.05 mm. As such, upon actuation of the pneumatic device 60, air can be drawn from the mold cavity into each of the venting tubes 31 via a space between the corresponding ejecting block 321 and the corresponding venting tube 31, or compressed air can be introduced into the mold cavity through the upper air passage unit 23 and the corresponding venting tube 31 so as to move the corresponding ejecting block 321 to an ejecting position shown in FIGS. 14 and 15 whereat the corresponding ejecting block 321 is moved into the mold cavity, thereby facilitating removal of a molded product from the molding surface 221 of the upper mold core 22.

With additional reference to FIGS. 6, 7, 8, 9, and 9A, the lower mold core 42 is further formed with a plurality of vertical guide holes 422 disposed between the mold cavity and the lower air chamber 431. The guide holes 422 are formed respectively at positions in the molding surface 421 difficult for the molding material to reach.

Figure 8:
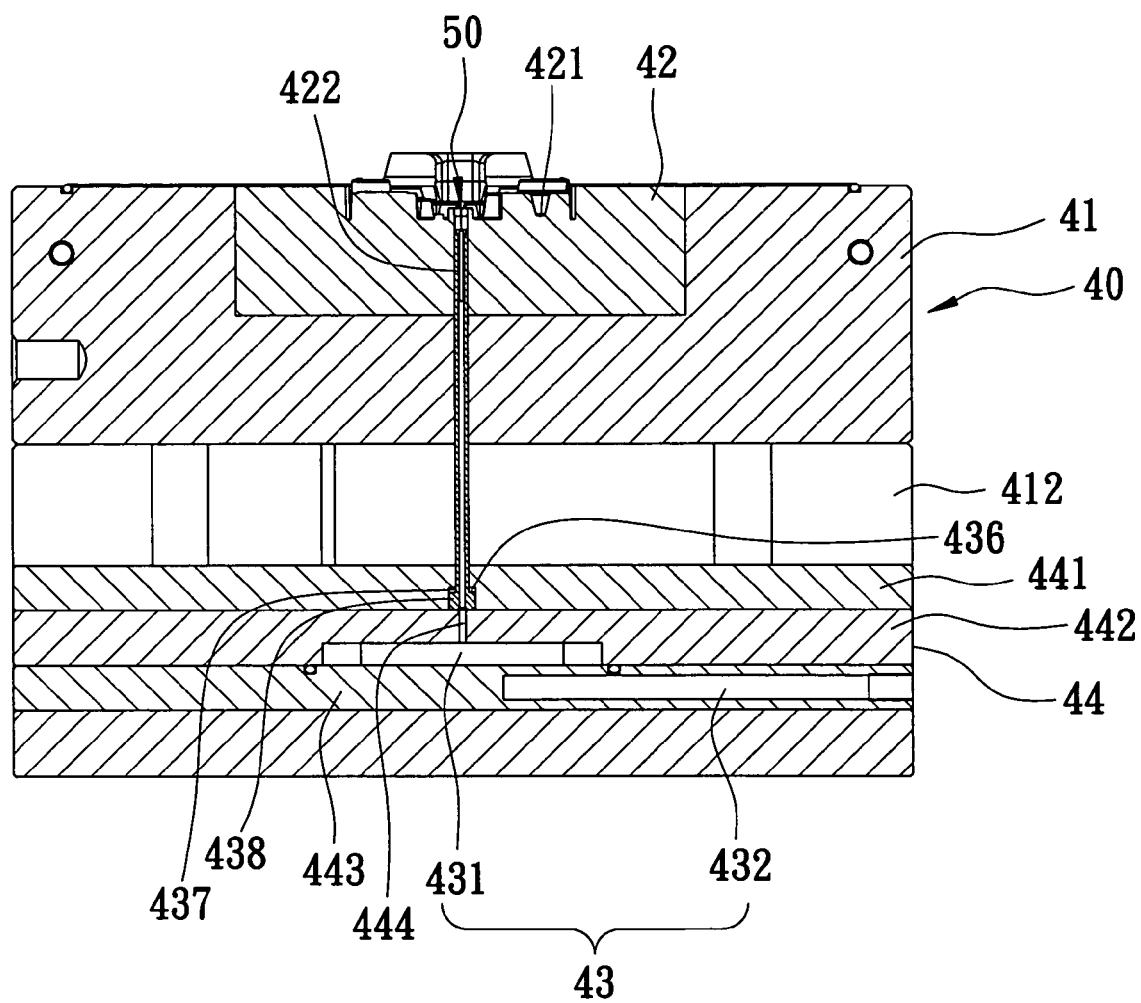
FIG. 8 is a sectional view taken along Line 8-8 in FIG. 7.
Figures 9, 9A:
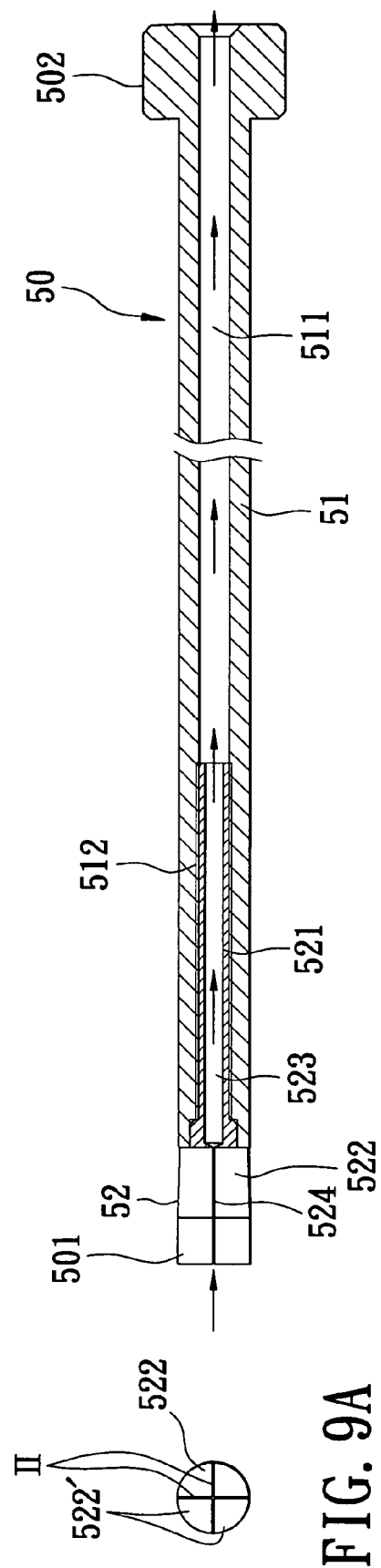
FIG. 9 is a sectional view of a lower ejecting unit of the preferred embodiment when an ejecting end is contracted.
FIG. 9A is a schematic view illustrating a cross-shaped slit formed in the ejecting end of the preferred embodiment.

The movable member 44 can be driven by the hydraulic device 70 to move vertically within a chamber 412 in the lower mold half 41. The movable member 44 includes a horizontal upper plate 441, a horizontal middle plate 442, and a horizontal lower plate 443. The upper plate 441 has a plurality of vertical counterbores 436 formed therethrough. Each of the counterbores 436 has a small-diameter bore portion 437 extending downwardly from a top surface of the upper plate 441, and a large-diameter bore portion 438 extending upwardly from a bottom surface of the upper plate 441 and connected to the small-diameter bore portion 437. The middle plate 442 has a top surface connected fixedly to and abutting against the bottom surface of the upper plate 441, and a plurality of vertical through holes 444 (only one is shown in FIG. 8) formed through the middle plate 442. The lower plate 443 has a top surface connected fixedly to and abutting against a bottom surface of the middle plate 442, and cooperates with the middle plate 442 so as to define the lower air chamber 431 therebetween. The lower air chamber 431 is communicated with lower ends of the through holes 444 in the middle plate 442.

Figure 12:
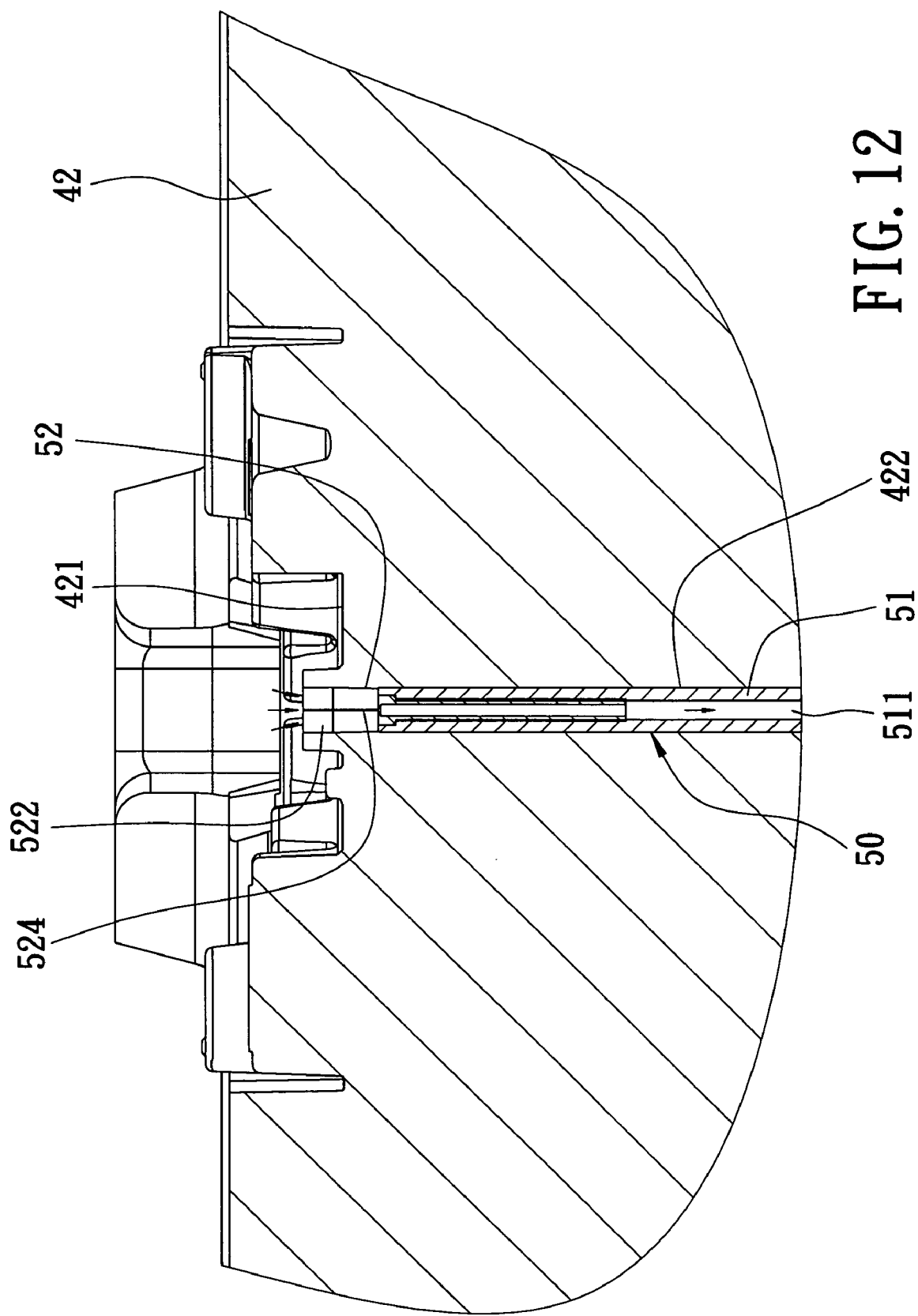
FIG. 12 is a fragmentary sectional view of the preferred embodiment, illustrating contraction of the ejecting end.
Figure 13:
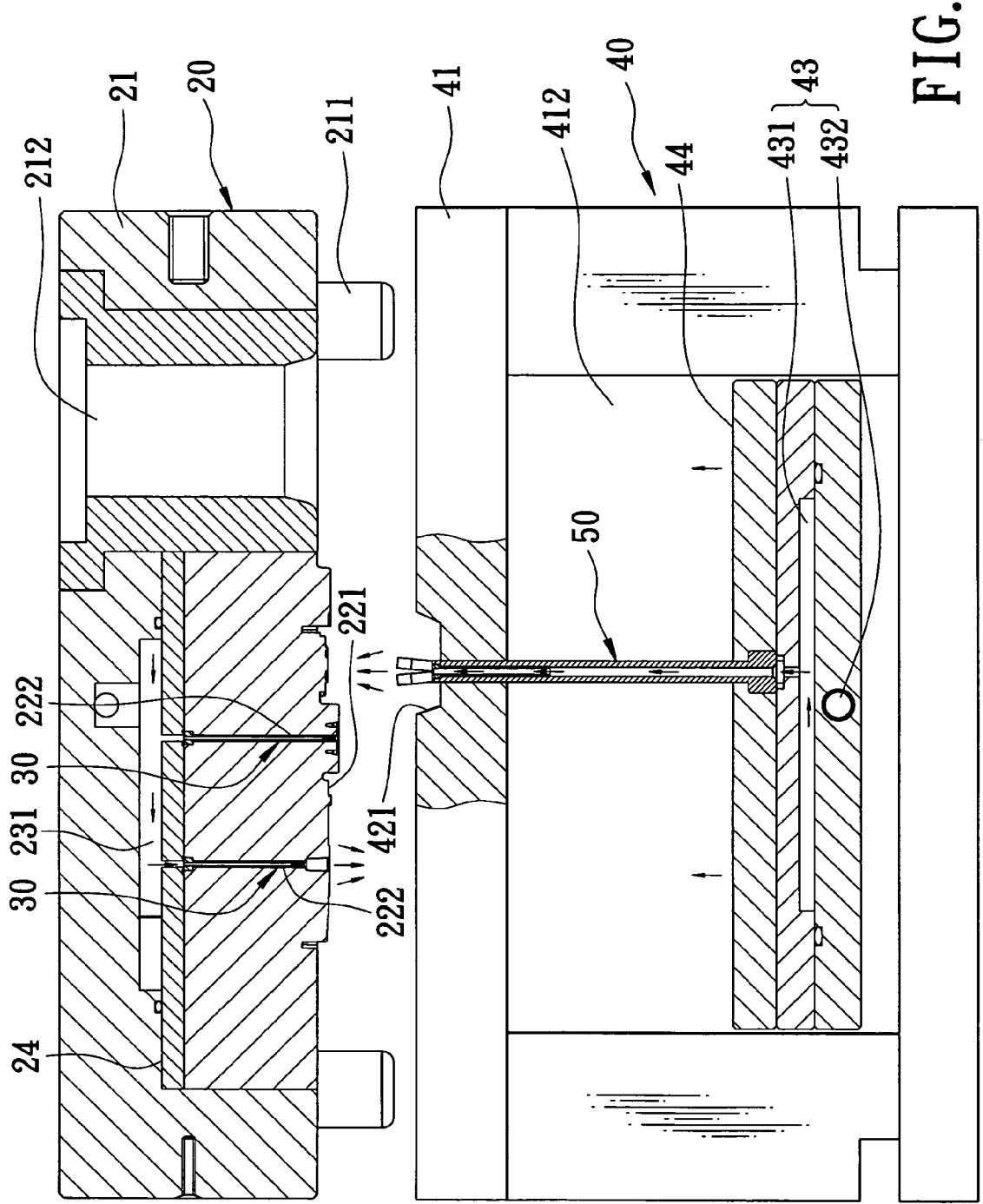
FIG. 13 is a schematic, partly exploded, partly sectional view of the preferred embodiment, illustrating how compressed air is introduced into the mold cavity.
Figure 16:
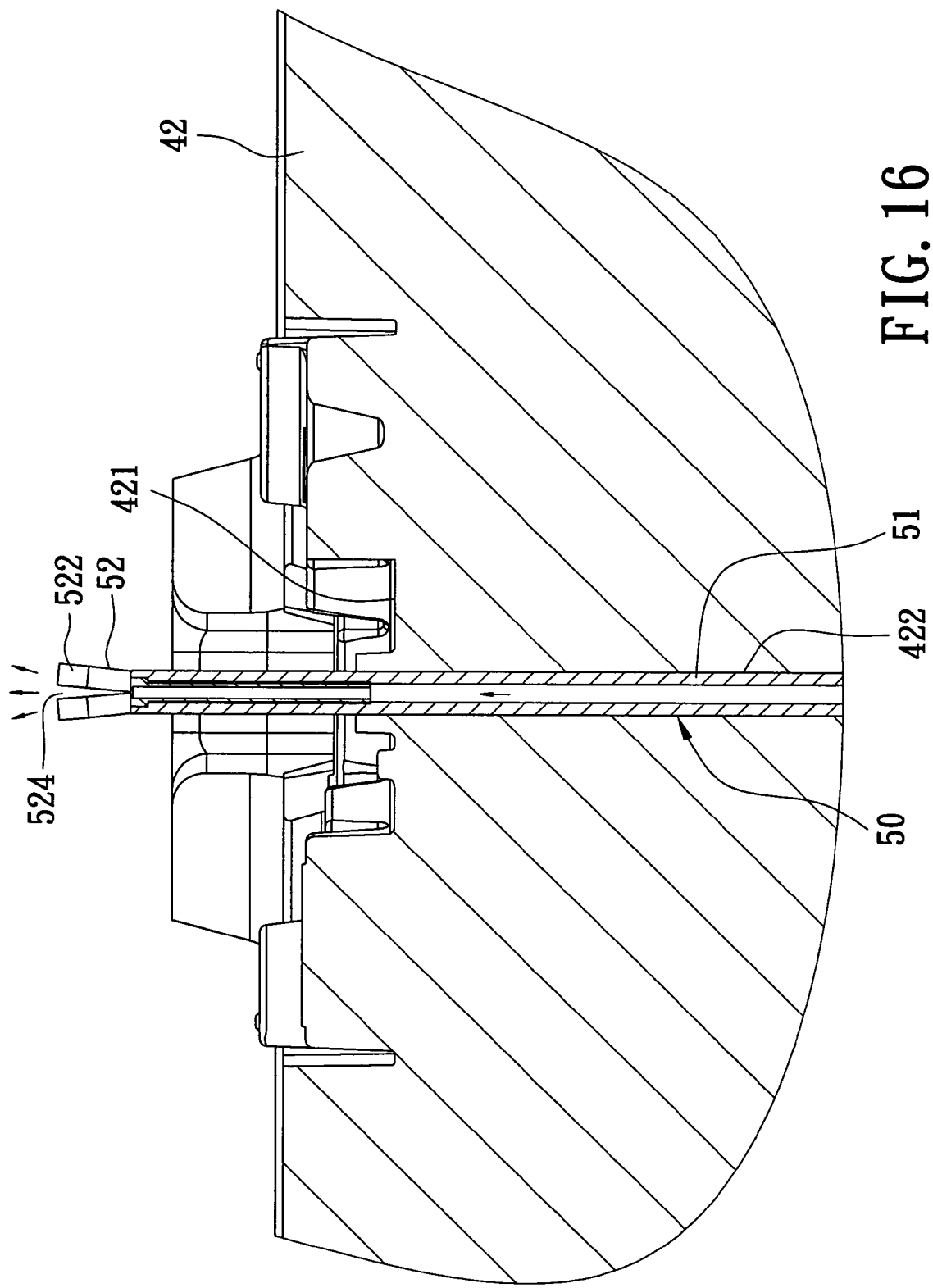
FIG. 16 is a fragmentary sectional view of the preferred embodiment when the ejecting end is expanded.

Each of the lower ejecting units 50 is configured as an ejecting tube, and is disposed movably within the corresponding guide hole 422. The ejecting tubes 50 extend respectively through the small-diameter bore portions 437. Each of the ejecting tubes 50 has an ejecting end 501 proximate to the mold cavity, and a coupling end 502 that has an outer diameter greater than that of the remaining portion of the corresponding ejecting tube 50, that is distal from the mold cavity, that is fitted within the corresponding large-diameter bore portion 438, that is anchored between the upper and middle plates 441, 442, and that is communicated with an upper end of the corresponding through hole 444 in the middle plate 442. As such, the ejecting tubes 50 are connected fixedly to the movable member 44. The hydraulic device 70 is operable so as to move each of the ejecting tubes 50 within the corresponding guide hole 422 between a retracted position shown in FIGS. 10 and 12 and an ejecting position shown in FIGS. 13 and 16. In the retracted position, the ejecting end 501 of the corresponding ejecting tube 50 is disposed outwardly of the mold cavity. In the ejecting position, the ejecting end 501 of the corresponding ejecting tube 50 is moved into the mold cavity so as to remove the molded product from the lower mold core 42.

Figure 17:
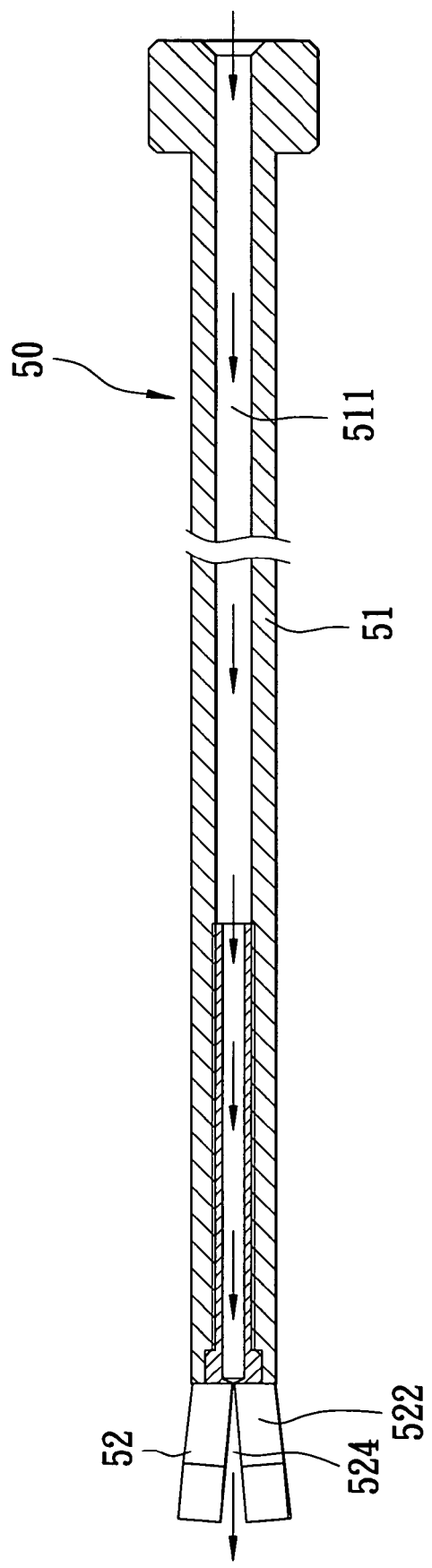
FIG. 17 is a sectional view of the lower ejecting unit of the preferred embodiment when the ejecting end is expanded.

Each of the ejecting tubes 50 includes a rigid tube body 51 and an end piece 52 that is made of steel spring. Each of the tube bodies 51 has an axial central hole 511 formed therethrough and having a threaded hole portion 512. Each of the end pieces 52 has an externally threaded section 521 engaging the corresponding threaded hole portion 512, an exposed section 522 formed integrally with the externally threaded section 521 and disposed outwardly of the corresponding tube body 51, and an axial central hole 523 formed therethrough. Each of the exposed sections 52 is formed with a cross-shaped slit 524 formed therethrough along axial and radial directions thereof so as to divide the corresponding exposed section 522 into four pivotable portions 522' (see FIG. 9A), which have free ends constituting the corresponding ejecting end 501. When each of the ejecting tubes 50 is disposed in the retracted position, the corresponding ejecting end 501 is contracted such that each of two intersecting slit portions (II) (see FIG. 9A) of the corresponding slit 524 has a width of about 0.03 to 0.05 mm, and serves as an air passage. Since the ejecting tubes 50 are communicated with the mold cavity and the lower air chamber 431, when the molding material is fed into the mold cavity, the pneumatic device 60 can be operated to draw air from the mold cavity into the ejecting tubes 50 so as to facilitate flow of the molding material to cause the same to contact the molding surface 421 of the lower mold core 42. The pneumatic device 60 is also operable to introduce compressed air therefrom into the mold cavity via the lower air passage unit 43 and the ejecting tubes 50 so as to facilitate removal of the molded product from the molding surface 421 of the lower mold core 42. When the compressed air flows through the end pieces 52, the free ends of the pivotable portions 522' of each of the end pieces 52 are moved radially away from each other, as shown in FIG. 17, that is, the ejecting ends 501 are expanded. Thus, a rate of which the compressed air flows into the mold cavity through the end pieces 52 is increased.

With this invention thus explained, it is apparent that numerous modifications and variations can be made without departing from the scope and spirit of this invention. It is therefore intended that this invention be limited only as indicated by the appended claims.

I claim:

1. A mold structure adapted to permit a molding material to be fed thereinto, said mold structure comprising:
   a mold seat including a pair of upper and lower mold units having respectively molding surfaces defining a mold cavity therebetween, said lower mold unit further having a lower air chamber adapted to be communicated with a pneumatic device, and at least one guide hole disposed between said mold cavity and said lower air chamber, said guide hole being formed in said molding surface of said lower mold unit at a position difficult for the molding material to reach; and
   an ejecting assembly including at least one lower ejecting unit, said lower ejecting unit being configured as an ejecting tube that is disposed movably within said guide hole and that has an ejecting end, said ejecting tube being communicated with said mold cavity and said lower air chamber such that the pneumatic device is operable to draw air from said mold cavity into said ejecting tube so as to facilitate flow of the molding material to cause the molding material to contact said molding surfaces when the molding material is fed into said mold cavity, said ejecting tube being operable to move within said guide hole between a retracted position whereat said ejecting end of said ejecting tube is disposed outwardly of said mold cavity, and an ejecting position whereat said ejecting end of said ejecting tube is moved into said mold cavity so as to remove a molded product from said lower mold unit when said upper mold unit is removed from said lower mold unit, the pneumatic device being also operable to introduce compressed air therefrom into said mold cavity via said lower air chamber and said ejecting tube so as to facilitate removal of the molded product from said lower mold unit;
   wherein said ejecting tube includes:
   a rigid tube body having an axial central hole that is formed therethrough and that has a threaded hole portion; and
   an end piece having an externally threaded section engaging said threaded hole portion of said central hole in said tube body, and an exposed section formed integrally with said externally threaded section and disposed outwardly of said tube body, said exposed section being formed with at least one slit formed therethrough along axial and radial directions thereof so as to divide said exposed section into a plurality of pivotable portions, said pivotable portions having free ends that constitute said ejecting end and that are moved away from each other such that a rate of which the compressed air flows into said mold cavity through said end piece is increased when the compressed air is introduced into said mold cavity by the pneumatic device.

2. The mold structure as claimed in claim 1, wherein said ejecting unit further includes a movable member disposed movably within said lower mold unit and adapted to be driven by a hydraulic device to move vertically within said lower mold unit, said ejecting tube further having a coupling end that is opposite to said ejecting end and that is connected fixedly to said movable member.

3. The mold structure as claimed in claim 2, wherein said coupling end of said ejecting tube has an outer diameter greater than that of the remaining portion of said ejecting tube, said movable member including:
   a horizontal upper plate having a counterbore formed therethrough, said counterbore having a small-diameter bore portion extending downwardly from a top surface of said upper plate, and a large-diameter bore portion extending upwardly from a bottom surface of said upper plate and connected to said small-diameter bore portion, said ejecting tube extending through said small-diameter bore portion, said coupling end of said ejecting tube being fitted within said large-diameter bore portion;
   a horizontal middle plate having a top surface connected fixedly to and abutting against said bottom surface of said upper plate such that said coupling end of said ejecting tube is anchored between said upper and middle plates, said middle plate further having a through hole having an upper end communicated with said coupling end of said ejecting tube; and a horizontal lower plate having a top surface connected fixedly to and abutting against a bottom surface of said middle plate, said lower plate cooperating with said middle plate so as to define said lower air chamber therebetween, said lower air chamber being communicated with a lower end of said through hole in said middle plate.

4. The mold structure as claimed in claim 1, wherein said ejecting tube defines at least one air passage having a width of about 0.03 to 0.05 mm when in said retracted position.

5. The mold structure as claimed in claim 1, wherein said end piece is made of spring steel.

6. The mold structure as claimed in claim 1, wherein said upper mold unit further has an upper air chamber adapted to be communicated with the pneumatic device, and at least one tube-receiving hole disposed between and communicated with said mold cavity and said upper air chamber, said tube-receiving hole in said upper mold unit being formed in said molding surface of said upper mold unit at a position difficult for the molding material to reach, said ejecting assembly further including at least one upper ejecting unit, said upper ejecting unit including:

a venting tube disposed within said tube-receiving hole in said upper mold unit and communicated with said upper air chamber and said mold cavity, said venting tube having an axial central hole that is formed therethrough and that has an outwardly diverging frustoconical hole end disposed in proximity to said mold cavity; and an ejecting rod disposed movably within said frustoconical hole end and having a frustoconical ejecting block disposed at an end of said ejecting rod proximate to said mold cavity and within said frustoconical hole end, said ejecting block being biased to a position whereat said ejecting block is disposed outwardly of said mold cavity and whereat said ejecting block is received almost fittingly within said frustoconical hole end such that air is capable of being drawn from said mold cavity into said venting tube via a space between said ejecting block and said venting tube by the pneumatic device, said ejecting block being movable into said mold cavity when the pneumatic device is operated to introduce the compressed air into said mold cavity through said venting tube.

7. The mold structure as claimed in claim 6, wherein said central hole in said venting tube further has an enlarged hole portion disposed in proximity to said frustoconical hole end, said ejecting rod further having a stop block disposed at an end thereof distal from said mold cavity, said upper ejecting unit further including a coiled compression spring that is disposed within said enlarged hole portion, that is sleeved on said ejecting rod, and that has two ends abutting respectively against said stop block and a shoulder of said venting tube defining an end of said enlarged hole portion so as to bias said stop block away from said shoulder.

\* \* \* \* \*